Oct. 23, 1956
B. I. SEEGER
2,767,561
RAM AIR CABIN PRESSURIZING SYSTEMS
Filed May 20, 1954
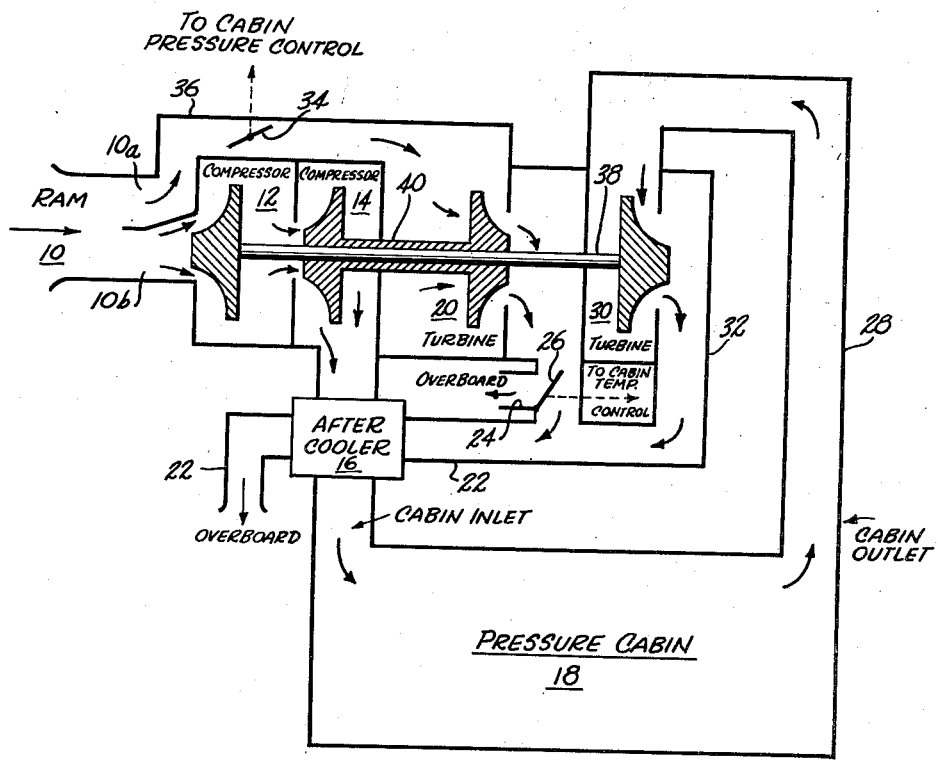
INVENTOR.
BERNARD I. SEEGER
BY
ATTORNEYS

United States Patent Office 2,767,561
Patented Oct. 23, 1956

2,767,561
RAM AIR CABIN PRESSURIZING SYSTEMS

Bernard I. Seeger, Seattle, Wash., assignor to Boeing Airplane Company, Seattle, Wash., a corporation of Delaware Application May 20, 1954, Serial No. 431,079

11 Claims. (Cl. 62—136)

This invention relates to systems for compressing air and passing the same continuously through an enclosure at a pressure and temperature suitable for human occupancy. The invention is particularly directed to pressurized ventilation systems for airplane cabins and is herein illustratively described by reference to the presently preferred form thereof. However, it will be evident to those skilled in the art that certain modifications and changes therein may be made without departing from the essential features involved.

Conventional airplane cabin pressurizing systems now in use operate on the principle of drawing compressed air from the engine air compressor, reducing the pressure and temperature of this compressed air to values conducive to human comfort and passing this conditioned air through the pressure cabin at an ample ventilating rate. Such systems are, of course, advantageous in their utilization of the existing air compressor which comprises an essential part of the engine. Moreover, with former types of airplanes, and particularly those employing reciprocating engines, that type of system has proved to be quite satisfactory. However, with the advent of turbojet engines and with the increasing flight altitudes attainable by airplanes propelled by these engines, the above-described conventional pressurizing system has certain inherent shortcomings.

One difficulty with utilizing the air compressor of a turbojet engine, for example, as the source of pressurized air for the airplane pressure cabin is the danger of air contamination. Lubricant decomposition products of a noxious and even toxic nature can be produced in the operation of these engines which, in the absence of sufficient precaution, may be carried into the pressure cabin with air delivered by the compressor. Suitable decontamination filters entirely adequate to meet this situation have not been forthcoming.

Another serious difficulty with the conventional pressurizing system as described above lies in the excess energy losses attending operation thereof. The compressor of a turbojet engine raises the pressure and also the temperature of indrawn air considerably above the values produced by a conventional reciprocating engine air compressor and greatly above the values required for human comfort in the airplane pressure cabin. Consequently, energy expended in meeting the pressurization requirements of the airplane cabin is expended relatively inefficiently. Unless arrangements are made for effectively recovering and utilizing energy stored in the overly compressed and overly heated air there is a substantial direct loss of energy entailed in reducing the pressure and the temperature of this air to values suitable for the pressure cabin.

In terms of apparatus requirements, the after cooling problem in such a system takes on serious proportions when the primary source of pressurized air is the air compressor of a turbojet engine.

It is of course readily obvious that the problem of air contamination may be overcome directly by obtaining fresh air for the pressure cabin through an air scoop or ram which is effectively isolated from the internal passages of the turbojet engine and its air compressor, so that there is no possibility of contaminous fumes infiltrating the pressurization system. However, former system proposals involving separate air collecting rams have apparently fallen short of attaining relatively high operating efficiency with compact, simple and practicable apparatus.

The present invention is based on the finding that the full power requirements for pressurizing high-speed airplanes, including passenger turbojet driven airplanes, can be satisfied with a relatively high degree of efficiency and in relatively simple manner by simultaneously extracting such power from two sources, one source being the ventilation discharge stream from the pressure cabin itself and the other source being an air collecting ram designed to provide mass air flow energy sufficient to make up for all, or substantially all, energy consumption and losses in the system. In accordance with this invention, the means for compressing air to supply the pressure cabin are driven solely by power extracted directly from the cabin discharge stream and from an air collecting ram. No separate heating apparatus and no engine power connections are required by this system.

As a further feature the entire after-cooling requirements (i. e. cooling of the compressed air before introduction into the pressure cabin) are supplied by passing the cooled air from the cabin discharge turbine and the ram air turbine through a suitable heat exchanger. In the preferred embodiment of the invention as herein disclosed the two turbines drive separate air compressor stages, and all four units are compactly arranged on a common axis.

The concept of supplying the entire pressurization energy requirements by means of a ram air driven turbine according to the above described arrangement offers exceptional advantages in terms of operating efficiency, mechanical simplicity, compactness and versatility not approached by such former systems as are known to have been proposed. A formerly proposed arrangement which merely harnessed ram air while permitting cabin discharge stream to go unharnessed would have relatively low operating efficiency, especially when an airplane is being flown at the customary high altitudes of the present day and the cabin discharge takes place at high relative pressures. Moreover, such a system requires relatively large mass air flow through its collecting ram and associated turbine in order to generate minimum required power to drive the air compressor. A formerly proposed system which did offer the possibility of extracting energy from the cabin exhaust stream required the addition of heat energy to such exhaust stream between the cabin outlet and the energy recovering device, in order to supply substantially the total energy requirements of the system. This latter proposed system was not self-starting hence required mechanical coupling to the airplane engine, and was relatively complicated, bulky and expensive.

By following a relatively direct thermodynamic approach to the problem of compressor and turbine design the present system can be constructed to operate at materially higher efficiency than former systems, and to present much simpler apparatus requirements than the most efficient of the previously proposed systems as mentioned above.

These and other features, objects and advantages of the invention will become more fully evident from the following description by reference to the accompanying drawing constituting a simplified schematic diagram of an airplane cabin pressurizing system incorporating the essential features of the present invention in its preferred form.

Referring to the diagram it will be noted that the intake ram 10 has a divided throat, part of the inflowing air entering the passage 10a and the remainder, the passage 10b. Air which enters the passage 10b is conducted into the first-stage compressor 12 and from there into the second stage compressor 14. The compressed air emerging from the compressor 14 is then conducted past heat exchange surfaces in the after cooler 16 before entering the pressure cabin 18 through the cabin inlet identified in the diagram.

Ram air entering the passage 10a is conducted to the air turbine 20 and from there to the discharge conduit 22 which carries the air into the after cooler 16 wherein it flows past heat exchange surfaces separating such air from the heated air flowing through the after cooler from the second stage compressor 14. The air from discharge conduit 22 is dumped overboard after it passes through the after cooler 16 is illustrated in the diagram.

The turbine 30 and the compressor 12 have rotors which are suitably mounted on a common shaft 38 so that all drive power for the first-stage compressor 12 is provided by the turbine 30 from the pressure cabin discharge stream. The compressor 14 and the turbine 20 have rotors suitably mounted on a common shaft 40 concentric to shaft 38. Accordingly, the second-stage compressor 14 receives its entire drive power from turbine 20, which extracts energy from the ram air stream flowing through conduit 36.

Before the air emerging from turbine 20 reaches the discharge passage 22, it flows by the entrance to a branching duct 24 out which some of this air may be diverted by the flap valve 26 situated at the entrance to the duct 24. Depending upon the position of this valve 26, a varying percentage of the air emerging from turbine 20 is permitted to reach discharge conduit 22 and the remainder to be dumped overboard directly through the branch duct 24. The flap valve 26 may be positioned by automatic temperature control apparatus for regulating pressure cabin air temperature, as will be hereinafter more fully explained.

In order to maintain a fresh air supply in pressure cabin 18, it is, of course, necessary to change the air in the cabin at a proper ventilating rate. Neglecting leakage, which can be kept at a minimum in a properly constructed airplane, the rate of discharge through the cabin outlet substantially equals the rate of influx through the cabin inlet, as depicted in the diagram. The cabin discharge stream flowing through conduit 28 is led to the turbine 30, wherein its useful energy is extracted. From the turbine 30 this spent, expanded air is conducted into a branch of the discharge conduit 22 through an intermediate conduit 32. Hence the discharge streams from the two turbines 20 and 30 merge and, as a coolant, pass through the after cooler 16 wherein temperature of the output from compressor 14 is lowered to the desired cabin temperature.

A butterfly valve 34 situated in the duct 36 between the ram passage 10a and the ram air driven turbine 20 provides a variable restriction in the duct 36 and may be controlled in accordance with variations in pressure requirements of the pressure cabin 18 to the end that a desired pressure is continuously maintained within the cabin.

When an airplane incorporating the illustrated cabin pressurization system is flown at very high altitudes, the pressure within the cabin 18 will be several times the static pressure of the surrounding atmosphere. Under these conditions the recoverable power content of the pressure cabin discharge stream carried by conduit 28 is a sizable fraction of the total power required to compress and pump the rarefied air through the pressure cabin at a suitable ventilating rate. Since the available pressure differential operating the turbine 30 is relatively high, i. e. when compared with the ram-created pressure differential operating the turbine 20, a correspondingly large amount of power is developed by the turbine 30 for the mass rate of air flow through that turbine. For this reason among others not only is the disclosed system highly efficient from the standpoint of energy requirements, but the apparatus involved may be made relatively small and compact. For instance, if for purposes of comparison it were to be required, as in one past proposal, that all power necessary for compressing and pumping the air through the pressure cabin be extracted entirely from ram air (i. e. without attempting to harness the discharge stream from the pressure cabin in accordance with the present invention) then the ram air mass flow requirement of the system and accordingly the size of the ram and of the ram turbine passages, etc., would be considerably greater than in the present case. In other words, under an assumed set of high altitude flight conditions it may be shown that the amount of air required to be collected by a ram in order to operate a cabin pressurizing system is greatly reduced by extracting recoverable power from the cabin discharge stream to supplement the power generated by a ram air driven turbine, as opposed to an arrangement in which all power is derived from a larger ram air driven turbine.

It is preferred for reasons of flexibility and convenience in design that the turbo-compressor pairs comprising compressor 14 and turbine 20 on the one hand and compressor 12 and turbine 30 on the other be mounted on separate shafts. Basically, however, the rotors of these four units could be mounted on a single shaft or could be mounted on separate shafts which are interconnected by gearing or other speed changing devices in case speed ratios other than one-to-one were considered desirable. Although less efficient than a two-stage compressor, it would be possible within the basic framework of the invention to compress and pump air through the pressure cabin 18 by means of a single-stage compressor connected to be driven by both of the turbines, either by means of a common drive shaft or by means of separate shafts interconnected through suitable speed changing devices.

From the standpoint of compactness the illustrated arrangement wherein the compressor and turbine units are coaxially arranged offers distinct advantages. However, it will be evident that non-coaxial arrangements may be employed without departing from the essential cooperative relationships between the various components.

It will be noted that in the process of driving the turbines 20 and 30 there is not only an attendant reduction of pressure but also a considerable reduction of temperature of the air which enters these turbines. Thus the stream of air flowing through discharge conduit 22 into the after cooler 16 is at relatively low temperature and serves as an effective coolant for air which is delivered by the compressors 12 and 14. The amount of cooling provided in the after cooler 16 is a function of both temperature and mass flow of the expanded air delivered by discharge conduit 22 into the heat exchange passages of the after cooler. Flap valve 26 which permits varying the proportion of air from turbine 20 which actually enters the discharge conduit 22 thereby serves as a means by which temperature of air in the pressure cabin may be regulated. This flap valve may be connected to suitable automatic temperature control mechanism (not shown) for providing automatic regulation of pressure cabin temperature. Any of various suitable temperature control arrangements may be used and the arrangement involving a simplified showing of flap valve 26 arranged to be connected to a cabin temperature control means is intended to be symbolic or representative.

It will also be evident that there are various possible ways by which to regulate pressure of air in the pressure cabin 18, including various combinations of different pressure sensing devices and different valving arrangements controlled by the pressure sensing devices. In the illustration the butterfly valve 34 is intended to represent or suggest one of numerous possible arrangements to accomplish that result. This butterfly valve is illustrated as being arranged for connection to an automatic cabin pressure control device (not shown) and by its position in the conduit 36 controls the amount of ram air which is permitted to flow through the ram air-driven turbine 20. By moving the valve 34 toward closed position the obvious result is a reduction of available power to drive compressor 14, hence a reduction of pressure in the pressure cabin 18. When the valve 34 is disposed parallel to the sides of the conduit 36, the full flow of air in ram passage 10a reaches turbine 20 and maximum pressurization takes place in the pressure cabin.

I claim as my invention:

1. An airplane cabin pressurizing system comprising in combination with a pressure cabin for the airplane, first duct means for conducting compressed air to the pressure cabin, and second duct means for removing air discharged from the pressure cabin and dumping such air overboard, a first ram means arranged in the airplane for collecting free air during airplane flight in quantities adequate for the pressure cabin, air compressor means arranged and operable to compress air collected by said first ram means and to force said compressed air through said first duct means into the pressure cabin, means cooperatively arranged with said first duct means for cooling said compressed air before injection thereof into the pressure cabin, and means constituting substantially the sole source of cabin pressurizing drive power for said compressor means during airpline flight, said latter means including a first air turbine arranged to be driven by air discharged through said second duct means from the pressure cabin, a second air turbine, and a second ram means arranged for collecting free air during airplane flight and passing the same through said second air turbine at a mass flow rate which supplies substantially the full energy requirements of said pressurizing system, said first and second turbines being drivingly connected to said air compressor means.

2. The airplane cabin pressurizing system defined in claim 1, wherein the compressed air cooling means comprises a heat exchanger connected to receive the discharge from said first and second air turbines, whereby the discharge from said turbines furnishes coolant for said heat exchanger.

3. The airplane cabin pressurizing system defined in claim 2, wherein the air compressor means comprises a first rotary compressor driven by the first air turbine, and a second rotary compressor driven by the second turbine.

4. The airplane cabin pressurizing system defined in claim 1, wherein the air compressor means comprises a first rotary compressor driven by the first air turbine, and a second rotary compressor driven by the second turbine.

5. An airplane cabin pressurizing system comprising in combination with an airplane pressure cabin, first duct means for conducting compressed air to the pressure cabin, and second duct means for removing air discharged from the pressure cabin and dumping such air overboard, ram means arranged in the airplane for collecting free air during airplane flight, air compressor means operable to compress air collected by said ram means and arranged to force said compressed air through said first duct means into the pressure cabin for supplying substantially the full pressurized air requirements thereof during airplane flight, means cooperatively arranged with said first duct means for cooling said compressed air before injection thereof into the pressure cabin, a first air turbine driven by air discharged through said second duct means from the pressure cabin and in turn drivingly connected to said compressor means, a second air turbine, drivingly connected to said compressor means, and ram means cooperating with said second air turbine, said latter ram means being arranged for collecting free air during airplane flight and passing the same through said second air turbine at a rate providing substantially the entire net power requirements of the pressurizing system during airplane flight.

6. The airplane cabin pressurizing system defined in claim 5, wherein the air compressor means comprises a first-stage compressor driven by the first air turbine, and a second-stage compressor arranged in series with said first-stage compressor and driven by the second air turbine.

7. An airplane compartment pressurizing system comprising, in combination with an airplane pressure compartment having a discharge outlet, means to collect and means to compress free air during airplane flight and force such compressed air into said compartment in quantities adequate for the pressure compartment, a first air-driven power means drivingly connected to said compressor means, duct means directing substantially the full discharge from said pressure compartment into said first air-driven power means for extracting recoverable energy from the pressure compartment discharge, a second air-driven power means drivingly connected to said compressor means, and air collecting ram means effective during flight of the airplane to collect free air and pass the same through said second air-driven power means to supply substantially the total energy requirements of the pressurizing system.

8. The airplane compartment pressurizing system defined in claim 7, and after cooler means interposed between the air compressor means and the pressure compartment for cooling compressed air before injection into said compartment, and duct means carrying the discharge from the air-driven power means through said after cooler for heat exchange thereof with compressed air flowing to the pressure compartment.

9. The airplane compartment pressurizing system defined in claim 7, wherein the air-driven power means comprise air turbines, the compressor means comprises a first rotary air compressor driven by the first air-driven turbine, and a second rotary air compressor driven by the second air-driven turbine.

10. The airplane compartment pressurizing system defined in claim 9, wherein the first and second rotary air compressors are rotationally independent of each other.

11. The airplane compartment pressuring system defined in claim 10, wherein the first compressor and first turbine are mounted on a first common shaft, and the second compressor and second turbine are mounted on a second common shaft coaxial to said first shaft.

References Cited in the file of this patent

UNITED STATES PATENTS

| | | |
|---|---|---|
| 2,453,923 | Mayo | Nov. 16, 1948 |
| 2,479,991 | Wood | Aug. 23, 1949 |
| 2,491,461 | Wood | Dec. 13, 1949 |
| 2,557,099 | Green | June 19, 1951 |